United States Patent [19]

Kunkel et al.

[11] Patent Number: 5,049,115
[45] Date of Patent: Sep. 17, 1991

[54] PULLEY FOR DRIVE SHAFT FOR A WATER PUMP AND METHOD FOR MAKING THE SAME

[75] Inventors: Heinrich Kunkel, Schweinfurt; Horst Ernst, Eltingshausen; Roland Haas, Hofheim; Gerhard Herrmann, Schweinfurt; Peter Horling, Mainberg; Elmar Mause, Schweinfurt; Gunter Neder, Schweinfurt; Armin Olschewski, Schweinfurt; Robert Stolz, Schweinfurt; Leo Vogelsanger, Schwebheim; Manfred Brandenstein, Eussenheim, all of Fed. Rep. of Germany

[73] Assignee: SKF GmbH, Scheinfurt, Fed. Rep. of Germany

[21] Appl. No.: 527,594

[22] Filed: May 23, 1990

[30] Foreign Application Priority Data

Jun. 9, 1989 [DE] Fed. Rep. of Germany ....... 3918820

[51] Int. Cl.$^5$ ............................................. F16H 55/36
[52] U.S. Cl. ..................................... 474/166; 474/174
[58] Field of Search ............... 474/166, 174, 176, 177, 474/179, 197; 29/159 A, 159 B

[56] References Cited

U.S. PATENT DOCUMENTS

| | | | |
|---|---|---|---|
| 3,090,337 | 5/1963 | Lyon | 29/159 A |
| 4,534,749 | 8/1985 | Hans et al. | 474/174 |
| 4,710,152 | 12/1987 | Ichikawa et al. | 474/166 |

Primary Examiner—Thuy M. Bui
Attorney, Agent, or Firm—Eugene E. Renz, Jr.

[57] ABSTRACT

Pulley for driving the shaft of a water pump, especially a pump for the cooling system of an internal combustion engine, the shaft being designed to be integral with a pulley body carrying the rim of the pulley, characterized in that the rim (15, 25, 31, 37) is designed as a sleeve and is attached to the pulley body (13, 22, 29, 39) in a form-locking or friction-locking manner.

11 Claims, 2 Drawing Sheets

PULLEY FOR DRIVE SHAFT FOR A WATER PUMP AND METHOD FOR MAKING THE SAME

FIELD OF THE INVENTION

The present invention relates to pulleys or shafts of water pumps and an improved method for making the same.

BACKGROUND OF THE INVENTION

Typically the water pumps in cooling systems of an internal combustion engine are driven by a belt. The water pump assembly usually has a shaft which mounts a pump rotor at one end located in the pump chamber and mounts a pulley at the other end exteriorally of the pump chamber. West German Registered Design No. 86-32,771 shows a pulley design for a v-belt or timing belt having a bore so that it can be mounted on the end of a shaft. The pulley is held in place against axial and rotational movement by a press fit.

It has been found that this type of assembly has certain disadvantages and drawbacks. For example, impact-like loads introduced by the belt during operation and the continuous vibrations of the belt have the effect of increasing the torque induced loads on the shaft pulley assembly by reason of the unfavorable relationship between the radius of the rim and the radius of the mounting bore of the pulley. By reason of this, there is the danger that the connection between the two can become loose and under certain extremely adverse conditions, may result in fracture of the hub area of the pulley. This failure can have deleterious consequences. For example, when the cooling system of an internal combustion engine fails without warning, the loosened pulley or broken parts are hurled through the engine compartment or into other moving parts.

Various solutions to this problem have been proposed. For example, the danger noted above in connection with the failure of a cooling system is addressed in French Patent No. 2,230,225. This patent shows a cup-shaped pulley with a rim and a pulley body designed as a single piece with a shaft of the water pump. In order to eliminate the danger of fracture in the transition area between the shaft and the pulley body, a fillet is provided. This necessitates, however, that the support of the shaft in the pump housing or in a pump cover sealing the pump housing needs to be installed underneath the rim to minimize the tipping moment caused by the belt. This means, however, that the seating surface for a roller bearing or the raceways for the rolling elements must be machined into the area of the shaft underneath the rim or as shown in the French Patent No. 2,230,225 in the inside surface of the ring. This type of machining operation is quite tedious and difficult by reason of the fact that the cup-like shape is projecting over the shaft. Consequently the end product is extremely expensive.

SUMMARY OF THE INVENTION

With the foregoing in mind, it is an object of the present invention to provide a new and improved pulley of the type generally described above, for driving a water pump, which is characterized by novel features of construction and arrangement to overcome some of the disadvantages and drawbacks of the prior assemblies discussed above, such as tendency to fracture or the tendency to become loose as a result of drive loads. To this end, the pulley is characterized by a rim designed as a sleeve which is attached to the pulley body in a form locking or friction locking manner. The advantage of this construction is that impact and vibrational loads introduced by the belt are not transferred to the joint area with any harmful amplification because the difference between the lever arms formed by the radius of the rim and by the radius of the sleeve shaped pulley body supporting the rim is very small.

Apart from the functional advantages noted above, the pulley can nevertheless be produced economically since before assembly of the sleeve shaped rim, the shaft of the bore of the rim is freely accessible.

In accordance with another feature of the present invention, the rim has a radially inwardly directed flange which rests against the end surface of the pulley body and is peened over at both end surfaces onto the pulley body. The peening may be carried out in a single step simultaneously both in the inner and outer end surfaces of the pulley body to produce especially good results in the connection. This is so because no spring back effects occur when peening is carried out in this way and the rim is attached to the pulley body in an extremely tight manner.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
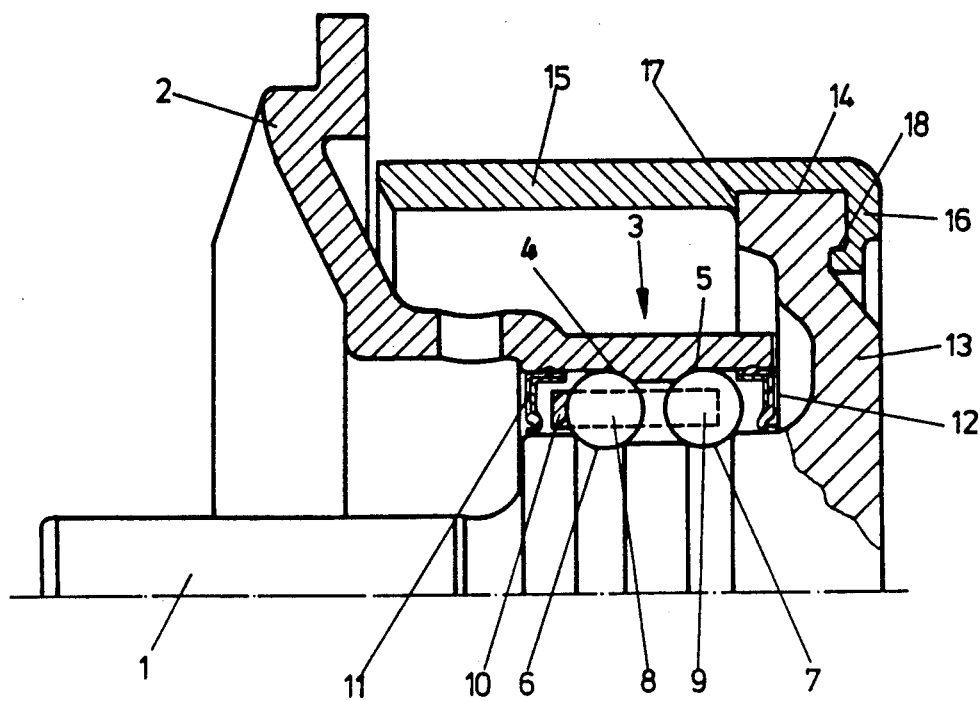
FIG. 1 is a transverse sectional view showing a pulley construction in accordance with the present invention.

Referring now to the drawings and particularly to FIG. 1 thereof, the invention is shown and described in association with a water pump for the cooling system of an internal combustion engine and only the essential elements have been shown and described, it being noted that the shaft can be driven by a belt in a conventional manner which is not shown. Thus, with particular reference to FIG. 1, the portion of the water pump assembly shown includes a shaft 1 supported in a pump cover 2 which serves to seal a pump chamber located in a pump housing or engine block. Pump cover 2 has an elongated tubular extension section 3 having formed on the inner peripheral surface thereof a pair of axially spaced raceways 4 and 5 for a two row, angular-contact ball bearing. The raceways are formed in the tubular extension 3 by machining. The inner raceway 6 and 7 for the two rows of balls 8 and 9 which are guided by a conventional cage are machined into an outer peripheral surface of shaft 1. The annular space housing the rolling elements between the shaft 1 and tubular extension 3 is sealed at both axial ends by sealing rings 11 and 12. The shaft 1 is designed to be integral with a pulley body 13 at the end thereof which emerges from the water pump as at 13a. The periphery of the pulley body has an area which is extended in the axial direction and has a seating surface 14 to support or hold a sleeve shaped rim 15. The bore in rim 15 has two sections 15a and 15b of different diameter D1 and D2 separated by a circumferentially extending shoulder 17. The end surface 17a of shoulder 17 can be extended by an upsetting or compressing process, for example, as shown in FIG. 1.

During assembly of the elements, the bore section of rim 15 with a larger diameter D2 is pushed axially onto seating surface 14 of pulley body 13 until it abuts shoulder 17. Thereafter the end 16 of rim 15 which projects beyond the outer surface of pulley 13 is flanged or peened over. A peripherally extending undercut 18 is provided on the outer surface of pulley body 13 which is concentric to seating surface 14. The flanged over edge 16 is thus pressed into this undercut area to ensure a tight reliable joint.

Figure 2:
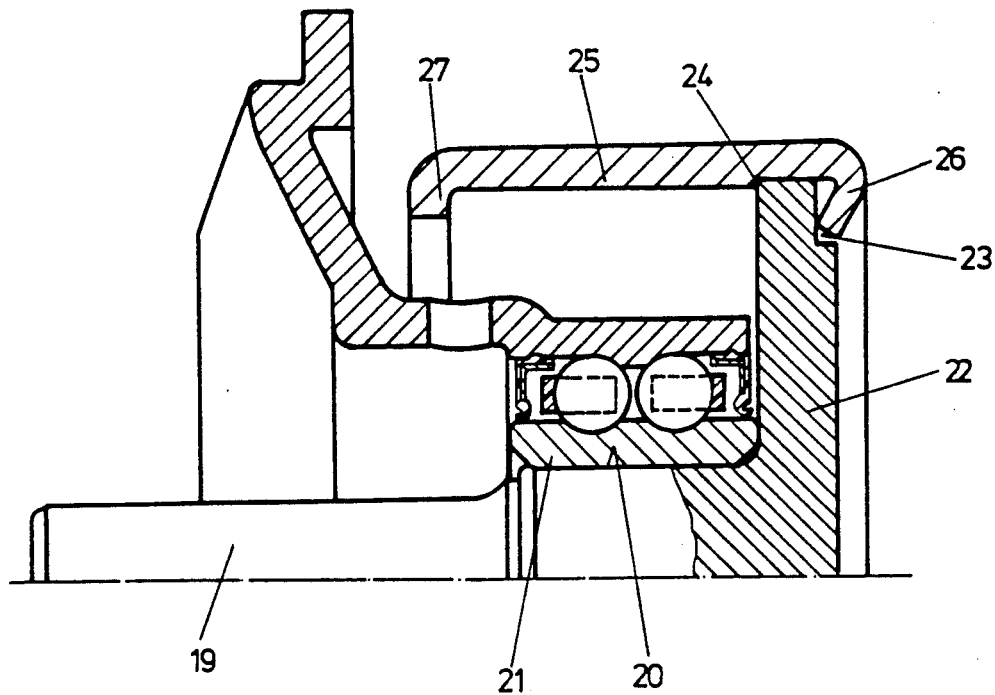
FIG. 2 is a transverse sectional view showing an alternate embodiment of a pulley in accordance with the present invention.

There is shown in FIG. 2 a modified embodiment of pulley assembly in accordance with the present invention. In accordance with this embodiment, the shaft 19 is provided with a circumferentially extending surface 20 to accommodate an inner ring of a ball bearing instead of having the inner raceways formed integrally therewith for the two rows of balls as is shown in FIG. 1.

Further, the end of the shaft 19 is designed as a pulley body 22 which has a circumferentially extending recess 23 on its outer end face. In accordance with this embodiment, the rim 25 is pressed or pushed onto pulley body 22 until it abuts shoulder 24 which serves as a stop. The rim is then flanged over onto the outer end surface of pulley body 22. In the present instance, however, the flanged over edge 26 is pressed into at least one recess 23 to prevent relative rotation of the rim on the shaft. The rim 25 is also flanged over in an inwardly radial direction on the opposite terminal end thereof facing the water pump to define a ring shape reinforcing rib 27, thereby increasing its dimensional stability.

Figure 3:
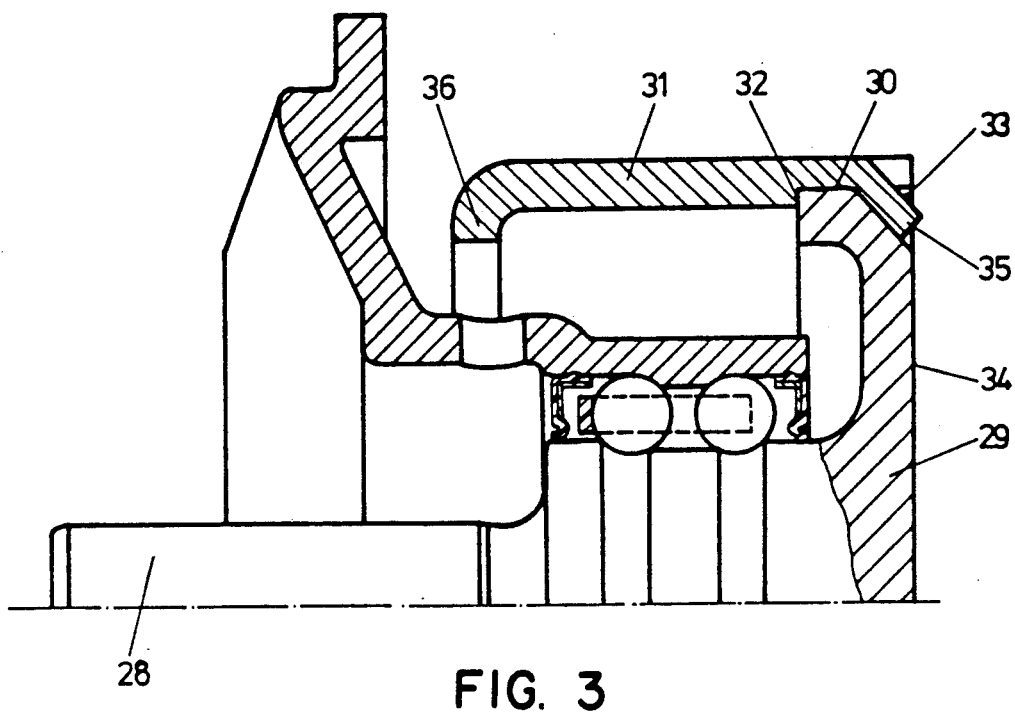
FIG. 3 is a sectional view similar to FIGS. 1 and 2 showing still a third embodiment of the present invention.

FIG. 3 shows still another modified form of pulley assembly in accordance with the present invention. In accordance with this embodiment of the invention, disc body 29 is formed integrally as a single piece at one axial end of the shaft 28 having an axially projecting circumferentially extending portion 30. Rim 31 is pressed onto the pulley body 29 until it comes pressed against a shoulder 32 in the bore of the rim 31.

At least one slanted recess 33 is provided in the pulley body 29 at the transition from the outer end surface 34 to the peripheral surface 30 to accommodate tab 35 bent down from rim 31. The tab 35 prevents the rim from rotating on the pulley body 29 and also secures the rim in an axial direction stiffened by a reinforcing rib 36 which is formed by the radially inwardly bent inner edge of rim 31. By this arrangement, the rim 31 can be made of a relatively thin material.

Figure 4:
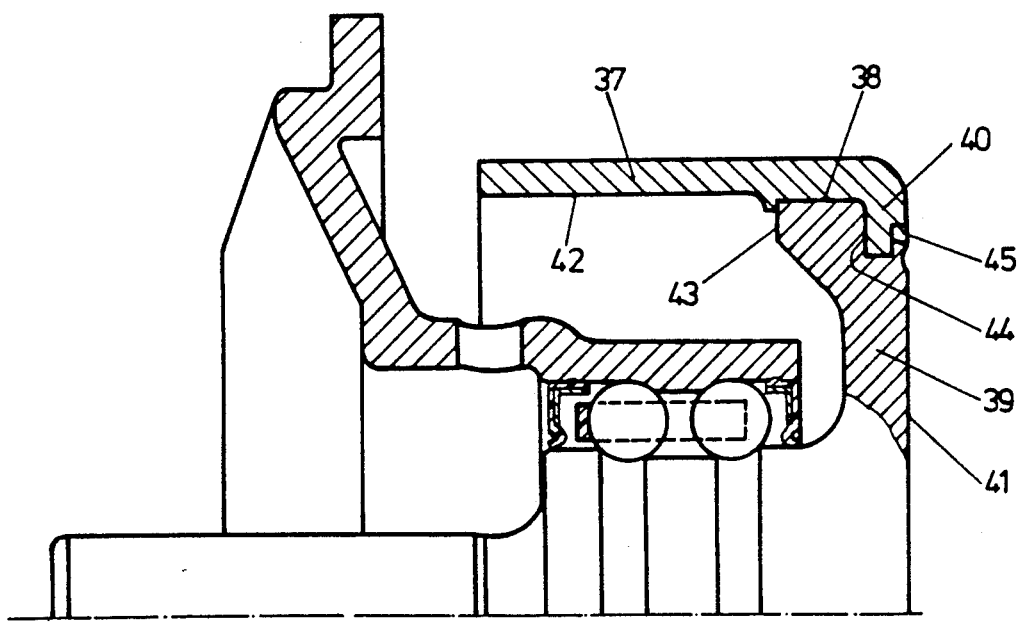
FIG. 4 is a fragmentary sectional view showing still another embodiment of a pulley in accordance with the present invention.

FIG. 4 shows still another embodiment of pulley in accordance with the present invention. In accordance with this embodiment, the pulley body 39 has on its outer periphery, a ring shaped recess 44 in its outer end face 41. A radially inwardly directed flange 40 of ring 37 engages in recess 44 after rim 37 has been pushed onto the outer periphery 38 of pulley body 39. Rim 37 is attached in this case to pulley body 39 by a process wherein it is simultaneously peened over the outer end and onto the inner end surfaces of the pulley body. As shown in FIG. 4, the material of pulley body 39 is pressed into a ring shaped recess 45 around the bore of flange 40 whereas material of rim 37 on the other side of pulley body 39 is pushed against the inner end surface of 43 of pulley body 39. In this instance, it is possible to peen the rim over on the outside and on the inside in the form of a ring either around the entire periphery or locally at several points around the periphery.

Even though particular embodiments of the present invention have been illustrated and described therein, it not intended to limit the invention and changes and modifications may be made therein within the scope of the following claims. For example, even though the pulley body is shown as a solid circular disc member, it can also be formed of other geometric configurations such as star shaped or be provided with openings.

What is claimed is:

1. The combination comprising a shaft;
   a pulley body having an outer periphery and formed intregally with the shaft; and
   a rim mounted on the outer periphery of the pulley body in the form of a sleeve attached to the pulley body in a form locking or friction locking manner.

2. Pulley according to claim 1, wherein said rim (15, 25, 31) extends beyond the outer periphery of the pulley body (13, 22, 29) and has an axial stop in its bore which rests against one end surface of the pulley body (13, 22, 29).

3. Pulley according to claim 2, wherein said rim (15, 25, 31, 37) is secured in place axially on the outer end surface of the pulley body (13, 22, 29, 39) by deformation.

4. Pulley according to claim 1 wherein said rim (25, 31) has at least one radially inward-projecting, ring-shaped reinforcing rib (27, 36) in its bore.

5. Pulley according to claim 1 wherein said rim (25, 31) is provided with at least one deformation (26, 35), which engages in a recess (23, 33) in the pulley body (22, 29).

6. Pulley according to claim 1 wherein said pulley body (13, 29, 39) has an axial expansion on its outer periphery to hold the rim (15, 31, 37).

7. Pulley according to claim 1 wherein said rim (37) grips around the outer periphery of the pulley body (39) and has a radially inward-directed flange (40) which rests against the outer end surface (41) of the pulley body (39), and in that the rim is peened over in its bore (42) onto the inner end surface (43) of the pulley body (39).

8. Pulley according to claim 7 wherein said pulley body (39) has, on the periphery of its outer end surface (41), a ring-shaped recess (44), in which the flange (40) of the rim (37) fits.

9. Pulley according to claim 7 wherein said flange (40) of the rim (37) is peened over onto the outer end surface (41) of the pulley body (39).

10. Pulley according to claim 7, wherein said flange (40) of the rim (37) has, on its outer end surface (41), a ring-shaped recess (45) around its bore, in which peened-over material engages.

11. A method for making a pulley having a pulley body and a rim connected to the pulley body consisting of the steps of simultaneously peening the rim (37) over the inner end surface (43) and onto the outer end surface (41) of the pulley body (39) in that the rim (37) is peening over simultaneously in one step both onto the inner end surface (43) and onto the outer end surface (41) of the pulley body (39).

* * * * *